United States Patent [19]
Marinaccio

[11] 3,896,671
[45] July 29, 1975

[54] TEMPERATURE COMPENSATED INDUCTIVE LIQUID METAL LEVEL INDICATOR
[75] Inventor: Lawrence F. Marinaccio, Big Beaver, Pa.
[73] Assignee: Mine Safety Appliances Company, Pittsburgh, Pa.
[22] Filed: Jan. 10, 1974
[21] Appl. No.: 432,151

[52] U.S. Cl. ............................................. 73/304 R
[51] Int. Cl. .......................................... G01f 23/26
[58] Field of Search ...................... 73/290 R, 304 R

[56] References Cited
UNITED STATES PATENTS
3,722,281   3/1973   Marsh ............................. 73/304 R Primary Examiner—Donald O. Woodiel
Attorney, Agent, or Firm—Brown, Murray, Flick & Peckham

[57] ABSTRACT

A liquid level inductance sensor incorporating means for compensating for temperature and non-linearity effects. Instead of using auxiliary temperature sensing devices for compensation, the inductance is made to act as its own temperature sensor. Two signals are derived from the sensor, one for temperature and the other for liquid level. These signals are processed in either digital or analog signal processing techniques to correct for non-linearity and temperature effects.

6 Claims, 5 Drawing Figures

PATENTED JUL 29 1975

3,896,671

SHEET 1

TEMPERATURE COMPENSATED INDUCTIVE LIQUID METAL LEVEL INDICATOR

BACKGROUND OF THE INVENTION

While not limited thereto, the present invention is particularly adapted for use with a liquid metal level indicator of the continuous coupled inductance type wherein two helical coils are wound over a long tubular form. One coil is connected to an alternating current supply source; while an induced voltage is taken from the secondary coil. The presence of surrounding liquid metal varies the coupling between the two coils and affects the emf output across the secondary coil. It is, of course, desired that this emf output be a linear function of the liquid level only; however, in practice, the emf is not linear within desired limits and is also a function of temperature. In the past, various methods of temperature compensation have been employed utilizing identical compensating inductances subjected to the same temperature, or using an auxiliary temperature sensing device to correct the output signal. This technique, of course, increases the cost and complexity of the installation.

SUMMARY OF THE INVENTION

In accordance with the present invention, a liquid metal level inductance sensor is provided which requires no auxiliary temperature sensing devices or compensating coils. Rather, the inductance of the sensor is made to act as its own temperature sensor. This is possible since liquid level sensors, by their very nature, are very poor inductances. The small diameter, high temperature wire that must be used for such inductors has a very high resistance compared to its inductive reactance. So much so, in fact, that the inductance can also be considered a wire-wound resistor. By winding the coil with a high temperature wire having an appreciable temperature coefficient of resistivity, the same coil can also be used as a temperature measuring device. A linear relationship between resistivity and temperature is not necessary since the invention incorporates means for processing separate temperature and level signals to correct for non-linearity and temperature effects.

The above and other objects and features of the invention will become apparent from the following detailed description taken in connection with the accompanying drawings which form a part of this specification, and in which.

Figure 1:
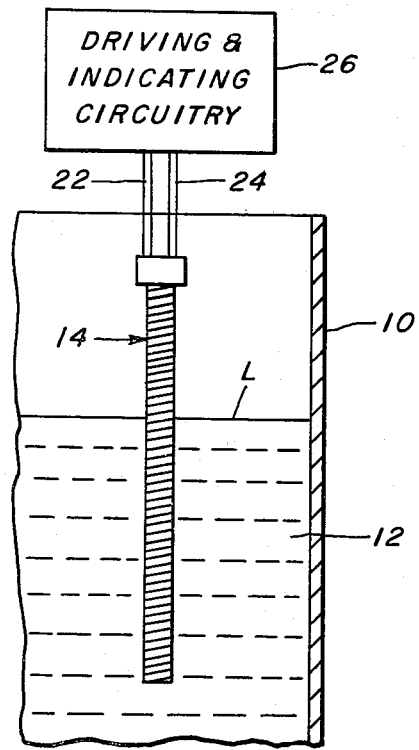
FIG. 1 is an illustration of a typical liquid metal level indicator of the continuous coupled inductance type.
Figure 1A:
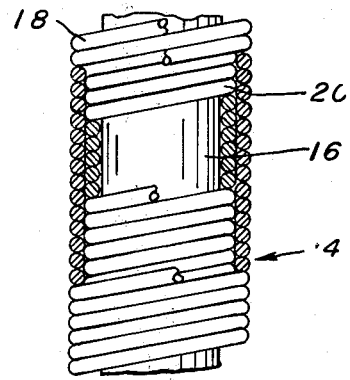
FIG. 1A is an enlarged broken-away view showing the dual coil construction of the sensor of FIG. 1.

With reference now to the drawings, and particularly to FIGS. 1 and 1A, there is shown a tank or container 10 partially filled with a liquid metal bath 12 up to the level L. Extending down into the bath 12 is a sensing probe 14 supported by any suitable means, not shown. As shown in FIG. 1A, the probe 14 comprises a core 16 having a pair of inductive coils 18 and 20 wound therearound. In the particular embodiment of the invention shown in FIG. 1A, the coil 20 is of smaller diameter than the outer coil 18; however the two coils can be intermeshed, just so long as the two are inductively coupled. The two coils 18 and 20 are connected through leads 22 and 24 (FIG. 1) to driving and indicating circuitry 26, about to be described.

Figure 2:
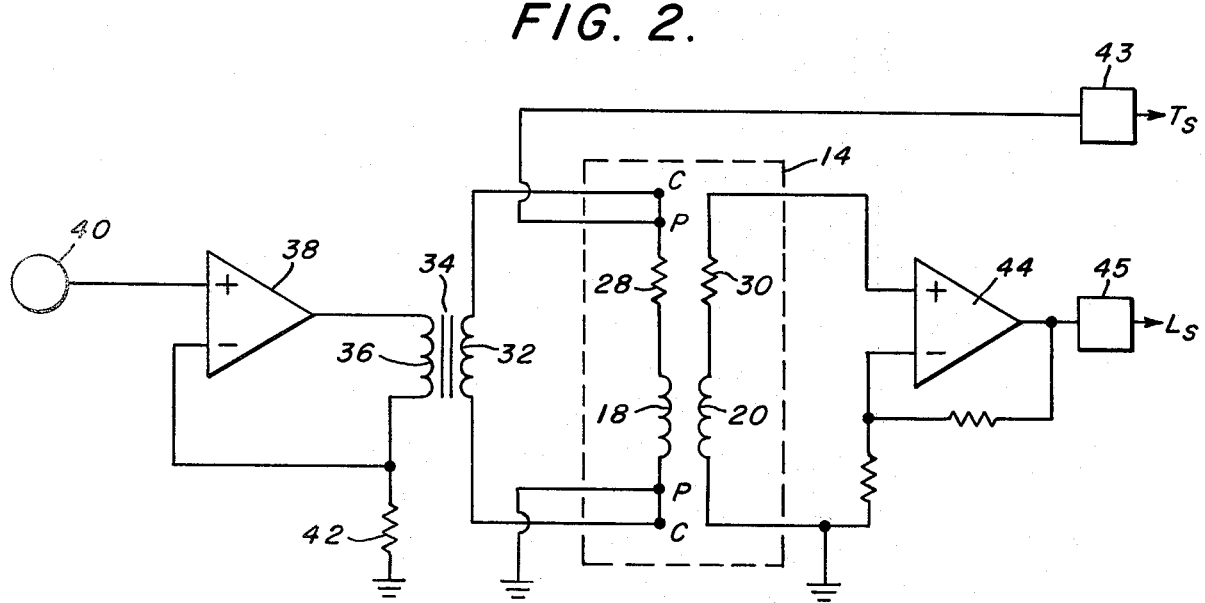
FIG. 2 is an equivalent circuit diagram of the liquid level detector of FIG. 1.

With reference now to FIG. 2, the two coils 18 and 20 are shown connected in series with resistors 28 and 30 which comprise the inherent resistances of the coils 18 and 20. The coil 18 is formed of a material having a high temperature coefficient of resistivity and is connected through a secondary winding 32 of transformer 34. The primary winding 36 of transformer 34 is connected to the output of an operational amplifier 38. One input to the operational amplifier 38 is connected to a source of alternating current 40; while the lower terminal of the primary winding 36 of transformer 34 is connected through resistor 42 to ground. The secondary winding 20 of the probe 14 is connected to the two inputs of a second operational amplifier 44.

The operational amplifier 38, using the current sensing shunt 42 as a feedback element, acts as a constant current source of high frequency alternating current. That is, the current furnished to the primary winding 18 of the probe 14 is independent of its impedance over its operating range. The primary coil 18 is shown as having two sets of terminals (i.e., current terminals $c$ and potential terminals $p$). The potential across the potential terminals $p$ is a function of the coil impedance and is converted to a d.c. signal by a suitable detector 43. The output of detector 43 is the temperature signal designated as $T_s$.

It is a known fact that the primary coil in a sensor of this type is largely resistive, especially if a magnetic core is not used. For that matter, a resistance to reactance ratio of 700 to 1 has been measured in one case. This being the case, the potential across the primary 18 is very nearly equal to the IR drop across the coil resistance designated 28. If this resistance, in turn, has a high temperature coefficient of resistivity, this potential drop is also a function of the coil temperature. Because of the constant current excitation, the primary ampere turns is not affected by this change in resistance. The secondary winding 20 effectively blocks out the large IR drop of the primary and transmits only the small quadrature voltage which is a function of the liquid metal level. Operational amplifier 44 is connectd as a high input impedance detector greatly reducing the attenuating effect of the secondary coil resistance $r_s$. The amplifier output is converted to a d.c. signal by a detector 45 consisting of an operational rectifier, phase sensitive detector, or any suitable detector. The output of detector 45 is the uncompensated liquid level signal $L_s$.

Signals from such inductance sensors are usually processed through an electronic amplifier which has a linear transfer function. In this case, however, the processed output signal is a non-linear function of two input variables, the temperature signal $T_s$ and the level signal $L_s$. The non-linear transfer function $f(T_s,L_s)$ can be synthesized electronically either digitally by converting the signals $T_s$ and $L_s$ to digital signals or by analog signal processing.

Figure 3:
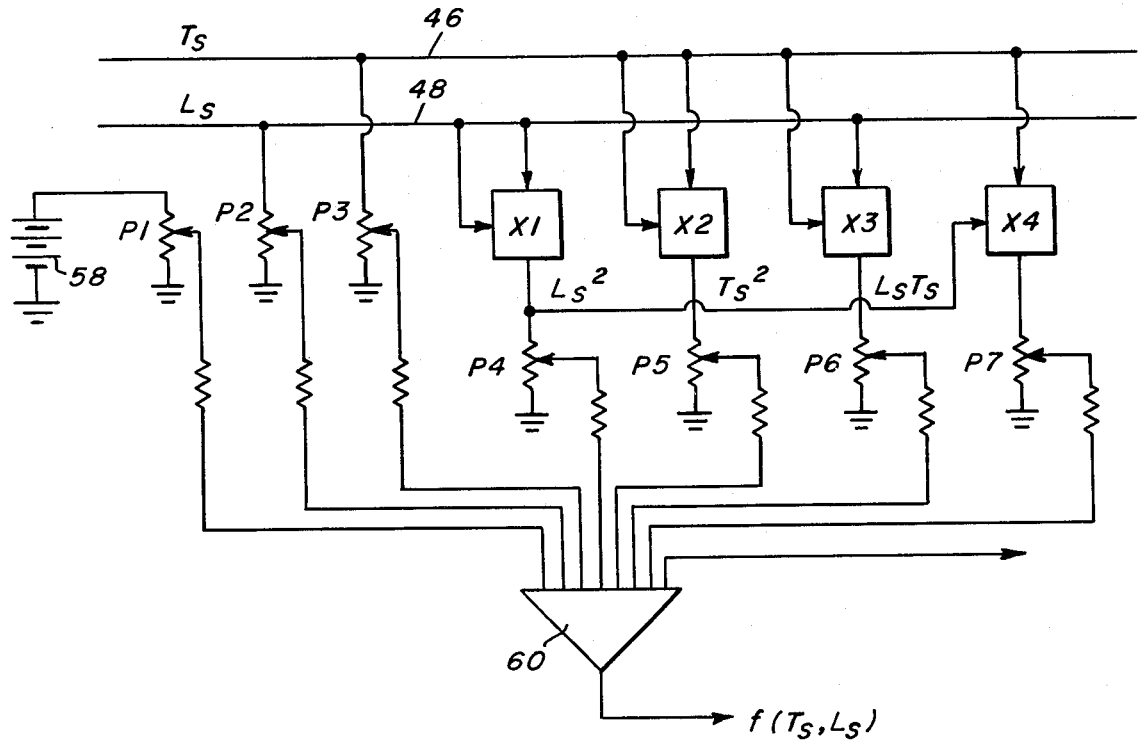
FIG. 3 is a schematic circuit diagram showing apparatus for correcting for temperature and non-linearity effects with analog techniques.
Figure 4:
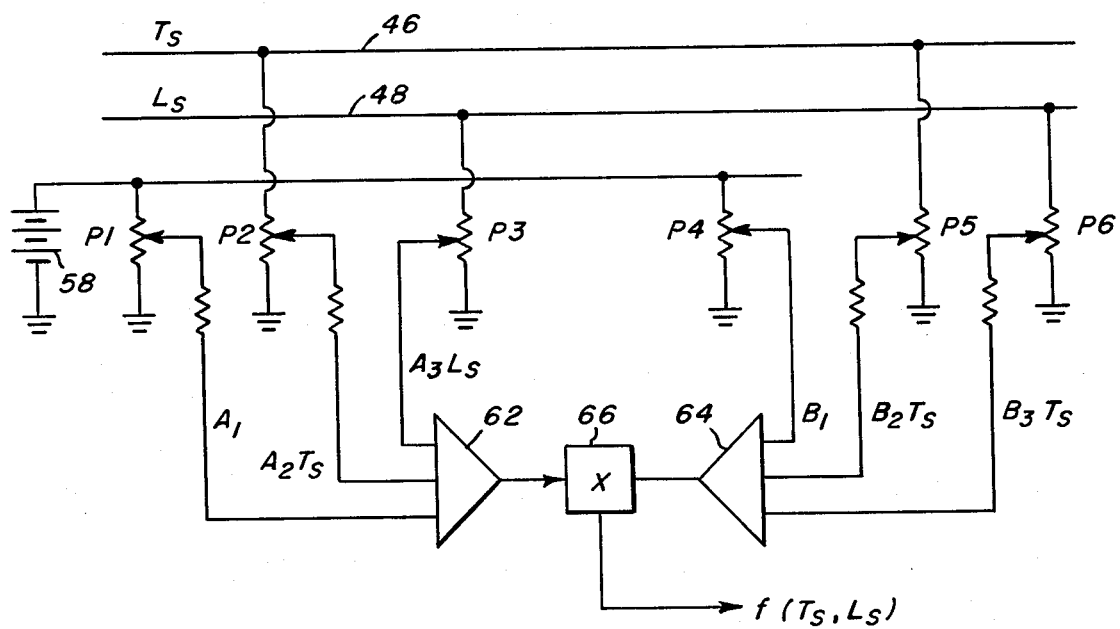
FIG. 4 is a schematic diagram of another embodiment of apparatus for correcting non-linearity and temperature effects.

Analog systems for electronically synthesizing the non-linear transfer function are shown in FIGS. 3 and 4. In FIG. 3, the signals $T_s$ and $L_s$ on leads 46 and 48 are applied across potentiometers P2 and P3; and these same signals are multiplied in multipliers X1, X2, X3 and X4. The outputs of the multipliers, in turn, are applied across potentiometers P4, P5, P6 and P7. A battery 58 or other similar source of direct current is connected to a potentiometer P1; while the taps on all potentiometers P1-P7 are applied to a summing amplifier 60 whose output comprises the non-linear transfer function $f(T_s,L_s)$. With the circuit of FIG. 3, the transfer function can be expressed as:

$$f(T_s,L_s) = C_1 + C_2 L_s + C_3 T_s + C_4 L_s^2 + C_5 T_s^2 + C_6 L_s T_s + C_7 L_s^2 T_s \ldots$$

The number of terms required will depend upon the desired amount of correction. The potentiometers P1-P7 with their associated resistors determine the values of coefficients $C_1$-$C_7$ in the foregoing equation. During calibration, the signals $T_s$ and $L_s$ are measured and tabulated over the desired range for operating temperatures. The temperature signal $T_s$ is recorded rather than the actual temperature. In this way, any non-linearity in the temperature measurement is calibrated out. This data is then processed on a digital computer using well-known curve fitting techniques to compute the values of the coefficients $C_1$-$C_7$. The potentiometers P1-P7 are then adjusted to these values.

The circuit of FIG. 3 can be simplified considerably and is used for illustration only. For example, if only six terms are required, the transfer function can be re-arranged so that only one multiplier is needed. This is shown by the circuit of FIG. 4 wherein the taps on potentiometers P1-P3 are fed to the input of summing amplifier 62 while those on potentiometers P4-P6 are applied to the input of summing amplifier 64. The outputs of the two summing amplifiers 62 and 64 are then multiplied in multiplier 66 to produce the desired transfer function in accordance with the equation;

$$f(T_s,L_s) = (A_1 + A_2 T_s + A_3 L_s)(B_1 + B_2 T_s + B_3 L_s)$$

Where greater accuracy or other considerations are required, the signals $T_s$ and $L_s$ may be converted to digital form and processed as described by a digital computer or calculator. Furthermore, this procedure need not be restricted to only two variables such as $T_s$ and $L_s$. For example, a third variable $t$ representing time could also be used to correct for time dependent effects.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In a liquid metal level detector of the type in which two coils are inductively coupled together and the presence of surrounding liquid metal varies the coupling between the two, the combination of a source of alternating current voltage connected to one of said coils, means for deriving a first signal which varies as a function of the voltage across said one coil and the temperature of the surrounding liquid metal, means for deriving a second signal across the other of said coils which varies as a function of the liquid metal level, and electrical computer means responsive to said first and second signals for electronically synthesizing an output signal proportional to liquid level which is a non-linear function of the magnitudes of the first and second signals.

2. The liquid metal level indicator of claim 1 wherein said source of alternating current connected to one of said coils comprises a constant current source.

3. The liquid metal level indicator of claim 2 including an operational amplifier coupling said source of alternating current voltage to said one coil.

4. The liquid metal level indicator of claim 1 wherein said other coil is coupled to the input of an operational amplifier.

5. The liquid metal level indicator of claim 1 wherein said means for electronically synthesizing an output signal proportional to liquid level comprises a series of potentiometers and multipliers responsive to said first and second signals.

6. The liquid metal level indicator of claim 1 wherein said one coil is formed from a material having a high temperature coefficient of resistivity.

* * * * *